Patented Apr. 24, 1945

2,374,381

UNITED STATES PATENT OFFICE 2,374,381

DRYING OIL PRODUCTS AND PROCESS OF MAKING

Frank B. Root, Montclair, N. J., assignor to Ellis-Foster Company, a corporation of New Jersey No Drawing. Application July 7, 1943,
Serial No. 493,752

5 Claims. (Cl. 260—342.4)

This invention relates to drying oils treated with olefinic dicarboxylic acids. In particular it relates to products obtained by heating drying oils and ethylene-alpha-beta-dicarboxylic acids, such as maleic, in the presence of a special type of catalyst, for the purpose of improving the properties of products of the drying oil-maleic type.

Drying oils of the tung oil class which contain conjugated double bonds react directly with maleic anhydride, simple heating together such as at 150° C. for a short time being sufficient. The unconjugated drying oils (including linseed, perilla, soya bean, walnut, sunflower, etc.) also combine with maleic anhydride but a relatively high temperature (substantially above 150° C.) and a relatively long time are required. The reaction between tung oil and maleic anhydride is considered to be what is known as the Diels-Alder Diene synthesis, maleic anhydride adding in a 1–4 position to two double bonds of the acid radical to form a tetrahydrophthalic acid derivative. The same type of reaction is believed to be involved in the reaction of the linseed-type oils and maleic anhydride. That is, under the influence of high temperature the double bonds of the acid radicals shift gradually to conjugated positions and the maleic then reacts therewith by the diene synthesis.

It has been proposed to accelerate the reaction of maleic anhydride and drying oils by heating them in the presence of acids stronger than maleic acid as catalysts (Rust, U. S. Patent 2,306,281). Such products, however, have a color that is too dark for many uses and the viscosity is extremely high.

I have found that when a drying oil of the linseed type is heated with an ethylene-alpha-beta-dicarboxylic acid or anhydride (maleic, fumaric, citraconic, etc.) in the presence of an organic peroxide the reaction is greatly accelerated, the peroxide apparently catalyzing the rearrangement of the double bonds to a conjugated position whereby the oil is able to unite directly with the acid. The reaction proceeds at 150° C. (or higher) and an adduct of the oil and unsaturated acid is obtained which is very light in color (in some cases lighter than the original oil) and of viscosity depending upon the length of heating. When a relatively small amount of maleic anhydride (from about 1% to 10%) is combined with linseed oil the drying time of the oil is improved and the dried film is harder than from the untreated oil. The oil bodies fairly rapidly when heated with suitable resins. Thus it is possible to obtain treated oils of enhanced hardening capacity which can be used to make improved paints and varnishes. Larger amounts of maleic anhydride (from 10% to about 30% based on the oil) can also, of course, be reacted.

The drying oil after combination with the unsaturated acid has an increased acid number. For example, linseed oil heated with 5% of maleic anhydride has an acid number of 25–35 and, with 10% of maleic anhydride, an acid number of 50–60. Where acidity is not important (for example, for a general purpose varnish or for mixing with neutral pigments) the oil may be used directly. But where acidity is harmful (for example, for alkali-resistant coatings and for mixing with basic pigments), the acid number may be reduced by converting the carboxyl groups to esters, amides or salts by reacting with alcohols, amines and metal compounds, respectively. For example, esters are formed particularly from polyhydric alcohols (glycerol, polyglycerol, glycols, polyglycols, pentaerythritol, sorbitol, etc.); amides are obtained by heating the treated oil with amines, particularly polyamines such as ethylene diamine, tetraethylenepentamine, hexamethylene diamine, etc.; and salts are obtained by mixing the oil with alkalies (including amines) or by heating it with metallic compounds such as the acetates of calcium, zinc and aluminum.

Organic peroxides have been used with drying oils to oxidize the natural antioxidants therein and also to replace the conventional metallic driers in drying oil alkyd resins. However, such uses are distinct from that of the present invention. Examples of suitable peroxides for use herein include such compounds as benzoyl peroxide, acetylbenzoyl peroxide, dibutyl peroxide, dilauryl peroxide, dioleyl peroxide and tertiary-butyl hydroperoxide. The amount of catalyst ranges from about 0.1% to about 2% based on the oil. Larger amounts have no increased advantage.

The process consists in heating the unconjugated drying oil and ethylene-alpha-beta-dicarboxylic acid or anhydride in the presence of the organic peroxide preferably in a closed system at about 150°–300° C., with agitation. When maleic anhydride is used, a test to show the progress of the reaction is to remove a sample of the oil, wash it to remove any unreacted maleic acid and determine the acid number. As an example of the extent to which the reaction is accelerated by a peroxide, linseed oil was heated with 5% maleic anhydride and 1% benzoyl peroxide during 1 hour to 200° C.

When tested for free maleic acid at this time the reaction was shown to be substantially complete. A similar mixture but omitting the peroxide was likewise heated to 200° C. during 1 hour, but 2 hours of additional heating at 200° C. were required to reach the same degree of reaction as the first mixture.

A distinguishing feature of the products obtained by heating an unconjugated drying oil and an ethylene-alpha-beta-dicarboxylic acid in the presence of an organic peroxide, besides the light color and color-stability, is the fact that such treated oils are emulsifiable on heating with water to give stable water-in-oil emulsions. For example, when equal parts of water and a peroxide-catalyzed linseed oil-maleic reaction product (that is, a product containing the residue of an organic peroxide) are heated to the boiling point of water with stirring, a stable creamy emulsion is obtained which can be thinned with oil. A linseed-maleic product which does not contain the residue of a peroxide (that is, it is produced without a peroxide) does not form a stable emulsion when treated thus. Ordinary oil-in-water emulsions are readily obtained from products containing 1-10% maleic by agitating the oil with aqueous alkali solutions (e. g., ammonium hydroxide). Oils containing high proportions of maleic are soluble in aqueous alkalies.

The following examples are given to illustrate the invention:

*Example 1.*—2375 parts of raw linseed oil and 25 parts of benzoyl peroxide were heated to 100° C. in a 3-neck flask equipped with thermometer, stirrer and air reflux condenser, and 125 parts of maleic anhydride were added. The temperature was taken to 200° C. over a period of 1 hour and held at 200°-220° C. for 3 hours. A clear, light-colored oil of low viscosity was obtained which had an acid number of 31. A sample of this oil when washed with water to remove any unreacted maleic acid had an acid number of 30 and when hydrolyzed the acid number of the fatty acids was 216. (A product obtained by heating linseed oil and maleic anhydride under the same conditions but without the peroxide was darker in color, slightly turbid and had an acid number after washing of only 19.)

When stirred with boiling water the oil forms a stable emulsion which is of the water-in-oil type since it can be diluted with oil and oil solvents but not with water. When agitated with water containing a small amount of ammonia or alkali, the oil forms an ordinary water-in-oil emulsion.

A 25-gallon varnish prepared by heating 1 part of ester gum and 2 parts of the peroxide-catalyzed oil to 250° C. in 35 minutes and holding at 250° C. for 1 hour was light colored. It dried tack-free in 4 hours and hard in 15 hours. Other oil-soluble resins, particularly phenolics and rosin-maleic resins, are suitable for forming varnishes from the oils of this invention.

*Example 2.*—250 parts of the peroxide-catalyzed oil of Example 1 and 7 parts of glycerol were heated at 220°-230° C. for 3 hours. A light-colored, clear, viscous oil was obtained. (The glycerol-esterified product of an oil prepared under the same conditions as that of Example 1 but without the catalyst was darker colored and contained small gelled particles suspended in the oil.)

*Example 3.*—150 parts of the oil of Example 1 and 5 parts of pentaerythritol were heated together at 250°-260° C. for 2 hours to give a light-colored oil of acid number 8, somewhat more viscous than the glycerol-esterified oil. A 25-gallon ester gum varnish prepared from the oil was light-colored and dried somewhat faster and harder than a similar varnish from the glycerol-esterified oil.

*Example 4.*—50 parts of the linseed oil-maleic product of Example 1 and 2.2 parts of calcium acetate were heated to 250° C. and held for 1 hour. This gave a light-colored, slightly waxy mass which was soluble in hydrocarbons and had an acid number of 6. A 25-gallon ester gum varnish prepared from the neutralized oil was light-colored and dried to a hard film.

*Example 5.*—A series of mixtures consisting of 95 parts raw linseed oil, 5 parts maleic anhydride and varying amounts of benzoyl peroxide was prepared and heated to 200° C. during 40 minutes, after which the temperature was held at 200°-220° C. for 2 hours. Samples of the products were washed with water to remove any unreacted maleic acid and the acid number determined. Also samples of each were saponified and the acid number of the fatty acids obtained. (The fatty acids from the untreated oil had acid number 197.) The following shows the results:

|   | Per cent catalyst | Acid number | |
|---|---|---|---|
|   |   | Washed product | Hydrolyzed product |
| a | 0 | 19 | 203 |
| b | 0.1 | 30 | 207 |
| c | 0.25 | 32 | 208 |
| d | 0.5 | 30 | 212 |
| e | 1.0 | 29 | 216 |

*Example 6.*—240 parts of raw linseed oil and 3 parts of benzoyl peroxide were warmed until the peroxide dissolved. Then 60 parts of maleic anhydride was added and the mixture was taken to 200° C. in 40 minutes and held at this point for 2⅓ hours. An extremely viscous, light-colored, clear product was obtained; acid number 76. It was soluble in aqueous ammonia. This product can be esterified with polyhydric alcohols to form light-colored alkyd resins.

*Example 7.*—570 parts of soya bean oil, 30 parts of maleic anhydride and 3 parts of benzoyl peroxide were heated to 200° C. during 1 hour and held at 200°-220° C. for 2 hours. The product was a clear light-colored oil of acid number 26, emulsifiable in boiling water to form a water-in-oil emulsion.

*Example 8.*—760 parts of linseed oil, 4 parts of tert.-butyl hydroperoxide and 40 parts of maleic anhydride were heated to 200° C. over a period of an hour and held at 200°-220° C. for an additional 1¼ hours. A clear, light-colored oil of low viscosity and acid number 28 was obtained which, when heated at 316° C. gelled in 55 minutes to form a light-colored mass.

*Example 9.*—190 parts of raw linseed oil, 10 parts of maleic anhydride and 1 part of dilauryl peroxide were heated (1 hour at 200° C. and 2 hours at 200°-220° C.). An extremely light-colored clear oil was obtained which was faster drying than the untreated oil.

I claim:

1. The process of heating an unconjugated drying oil with an ethylene-alpha-beta-dicarboxylic acid in the presence of an organic peroxide as catalyst.

2. The process of heating linseed oil with an ethylene-alpha-beta-dicarboxylic acid in the presence of an organic peroxide as catalyst.

3. The process of heating an unconjugated drying oil with maleic acid anhydride in the presence of an organic peroxide as catalyst.

4. The process of heating linseed oil with maleic anhydride in the presence of benzoyl peroxide as catalyst.

5. A light-colored, water-in-oil emulsifiable reaction product of an unconjugated drying oil and an ethylene-alpha-beta-dicarboxylic acid containing the residue of an organic peroxide, prepared by heating an unconjugated drying oil and an ethylene-alpha-beta-dicarboxylic acid in the presence of an organic peroxide.

FRANK B. ROOT.